US011675651B2

United States Patent
Li et al.

(10) Patent No.: US 11,675,651 B2
(45) Date of Patent: Jun. 13, 2023

(54) CRITICAL PROBLEM EXCEPTION HANDLING

(71) Applicant: INTERNATIONAL BUSINESS MACHINES CORPORATION, Armonk, NY (US)

(72) Inventors: Naijie Li, Beijing (CN); Bao Zhang, Beijing (CN); Jin Hong Fu, Beijing (CN); Jing Lu, Beijing (CN); Xiang Zu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 17/198,450

(22) Filed: Mar. 11, 2021

(65) Prior Publication Data
US 2022/0291988 A1 Sep. 15, 2022

(51) Int. Cl.
G06F 11/07 (2006.01)
G06F 9/50 (2006.01)
G06F 9/30 (2018.01)
G06F 9/38 (2018.01)

(52) U.S. Cl.
CPC ...... *G06F 11/0793* (2013.01); *G06F 9/30065* (2013.01); *G06F 9/3861* (2013.01); *G06F 9/5016* (2013.01); *G06F 11/0772* (2013.01)

(58) Field of Classification Search
CPC ............. G06F 11/0793; G06F 9/30065; G06F 9/3861; G06F 9/5016; G06F 11/0772
USPC .......................................................... 714/15
See application file for complete search history.

(56) References Cited

U.S. PATENT DOCUMENTS

| 5,628,016 A | 5/1997 | Kukol |
| 7,194,744 B2 | 3/2007 | Srivastava |
| 7,240,343 B2 | 7/2007 | Ogasawara |
| 7,640,450 B1 | 12/2009 | Anvin |
| 7,810,072 B2 | 10/2010 | Barcia |
| 8,037,459 B2 | 10/2011 | Mavinakayanahalli |

(Continued)

FOREIGN PATENT DOCUMENTS

| CN | 104361076 B | 2/2015 |
| KR | 101416762 B1 | 2/2013 |

OTHER PUBLICATIONS

Wikipedia "exception handling" pages from date Mar. 10, 2021, retrieved from https://web.archive.org/web/20210310094906/https://en.wikipedia.org/wiki/Exception_handling (Year: 2021).*

*Primary Examiner* — Yair Leibovich
(74) *Attorney, Agent, or Firm* — Jordan T. Schiller (57) ABSTRACT

Methods, apparatus, computer program products for handling critical problem exceptions during an execution of an application are provided. The method comprises: detecting, by one or more processing units, an occurrence of a certain type of critical problem exception during an execution of an application, the critical problem exception resulting in a termination of the application; instructing, by one or more processing units, to call a Super Handling Routine (SHR) corresponding to the type of the critical problem exception at a pre-configured address based on a pre-determined context registered by the application, the SHR being configured to handle critical problem exceptions; and handing, by one or more processing units, control to the SHR to handle the type of the critical problem exception.

14 Claims, 4 Drawing Sheets

(56) References Cited

U.S. PATENT DOCUMENTS

| | | | |
|---|---|---|---|
| 9,438,491 B1* | 9/2016 | Kwok | G06F 11/3466 |
| 10,338,929 B2 | 7/2019 | Smith | |
| 2017/0068455 A1* | 3/2017 | Xing | G06F 21/125 |
| 2018/0113811 A1 | 4/2018 | Xing | |
| 2018/0293078 A1 | 10/2018 | Gabrielli | |
| 2019/0108036 A1 | 4/2019 | Texeira | |

* cited by examiner

CRITICAL PROBLEM EXCEPTION HANDLING

BACKGROUND

The present application relates to computing, and more specifically, to methods, systems and computer program products for critical problem exception handling.

In computing and computer programming, exception handling is the process of responding to the occurrence of exceptions—anomalous or exceptional conditions requiring special processing—during the execution of an application. In general, an exception breaks the normal flow of execution and executes a pre-registered exception handler, and the details of how this is done depend on how an exception is implemented. It is provided by specialized programming language constructs. Some exceptions may be handled so gracefully that execution can resume where it was interrupted.

SUMMARY

In one illustrative embodiment of the present disclosure, there is provided a computer-implemented method for handling a critical problem exception. The method comprises detecting, by one or more processing units, an occurrence of a critical problem exception during an execution of an application, the critical problem exception resulting in a termination of the application; instructing, by one or more processing units, to call a Super Handling Routine (SHR) corresponding to the type of the critical problem exception at a pre-configured address based on a pre-determined context registered by the application. The SHR comprises program instructions that, when executed on a processor 102, handle critical problem exceptions. and handing, by one or more processing units, control to the SHR to handle the type of the critical problem exception.

In another embodiment of the present disclosure, there is provided a computer system for handling a critical problem exception. The computer system comprises a critical problem checker, configured to detect an occurrence of a certain type of critical problem exception during an execution of an application, the critical problem exception resulting in a termination of the application. The computer-implemented apparatus also comprises an exception super handling controller, responsive to the occurrence of the critical problem exception, configured to issue instructions to call a Super Handling Routine (SHR) corresponding to the type of the critical problem exception at a pre-configured address based on a pre-determined context registered by the application; and handing control to the SHR to handle the type of the critical problem exception, wherein the SHR is configured to handle critical problem exceptions.

Computer program products for improving the performance of a web-based application are also provided.

These and other features and advantages of the present disclosure will be described in, or will become apparent to those of ordinary skill in the art in view of, the following detailed description of the example embodiments of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Embodiments of the present invention will be described in more detail with reference to the accompanying drawings, in which the embodiments of the present invention have been illustrated. However, the present invention can be implemented in various manners, and thus should not be construed to be limited to the embodiments disclosed herein.

Figure 1:
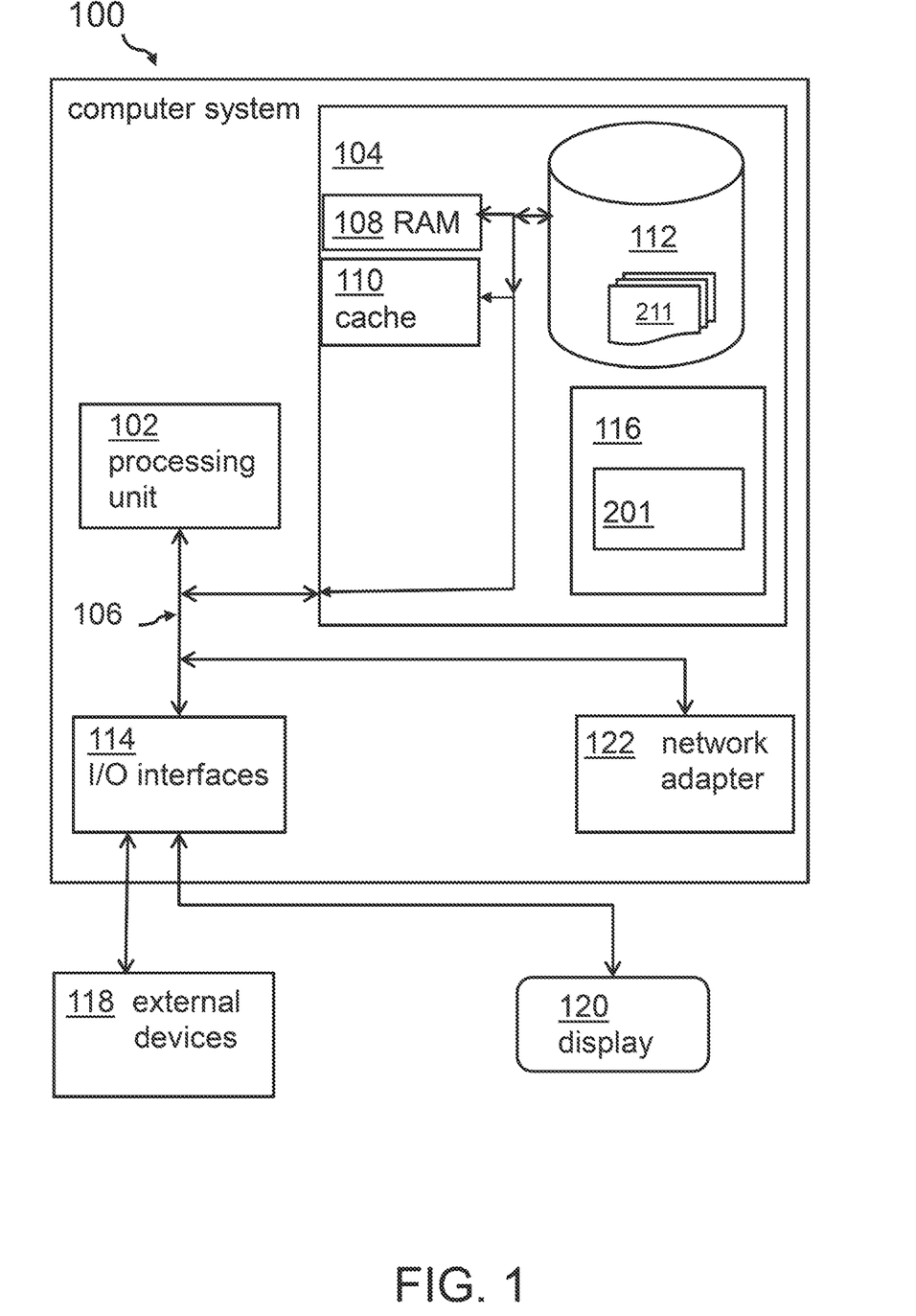
FIG. 1 shows an exemplary computer system according to embodiments of the present disclosure.

Referring now to FIG. 1, an exemplary computer system 100 according to embodiments of the present disclosure is shown. Computer system 100 is only illustrative and is not intended to suggest any limitation as to the scope of use or functionality of embodiments of the disclosure described herein.

As shown in FIG. 1, computer system 100 may include one or more processors or processing units 102, a system memory 104, and a bus 106 that couples various system components including system memory 104 to processor 102.

Bus 106 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System memory 104 can include memory, such as random access memory (RAM) 108 and/or cache memory 110. Computer system 100 may further include other removable/non-removable, volatile/non-volatile computer system storage media. By way of example only, storage system 112 can be provided for reading from and writing to a non-removable, non-volatile magnetic media (typically called a "hard drive"), a magnetic disk drive (e.g., a "floppy disk"), or an optical disk drive such as a CD-ROM, DVD-ROM or other optical media. In such instances, each can be connected to bus 106 by one or more data media interfaces. As will be further depicted and described below, memory 104 may include at least one program product having a set (e.g., at least one) of program modules that are configured to carry out the functions of embodiments of the disclosure.

The operating system 116, includes at least one component, such as recovery management 200. One or more program modules 211, may be stored on in storage system 112 for loading into, and executing in, memory 104. Each of the operating system, one or more application programs, other program modules, and program data or some combination thereof, may include an implementation of a networking environment. Program modules 211 generally carry out the functions and/or methodologies of embodiments of the disclosure as described herein.

Computer system 100 may also communicate with one or more external devices 118 such as a keyboard, a pointing device, a display 120, etc.; one or more devices that enable a user to interact with computer system 100; and/or any devices (e.g., network card, modem, etc.) that enable computer system 100 to communicate with one or more other computing devices. Such communication can occur via Input/Output (I/O) interfaces 114. Still yet, computer system 100 can communicate with one or more networks such as a local area network (LAN), a general wide area network (WAN), and/or a public network (e.g., the Internet) via network adapter 122. As depicted, network adapter 122 communicates with the other components of computer system 100 via bus 106. It should be understood that although not shown, other hardware and/or software components could be used in conjunction with computer system 100. Examples, include, but are not limited to: microcode, device drivers, redundant processing units, external disk drive arrays, RAID systems, tape drives, and data archival storage systems, etc.

It should be pointed out that the exemplary computer system 100 which is applicable to implement embodiments of the present disclosure is described with reference to FIG. 1 in the above, however, any other existing or future developed systems, apparatuses, devices, etc. are also applicable to implement embodiments of the present disclosure.

As discussed in Background, exception handling is the process of responding to the occurrence of exceptions during the execution of an application. Current exception handling mechanisms allow an application to pre-register exception handlers which disrupt the normal flow of the application's instruction that resulted in an exception. Exception handlers may be able to fix some issues that are predictable, or restore the environment or context back to the point before the exception, or save necessary data and notify an administrator before a termination of an application. However, current exception handling mechanisms fail to handle critical problem exceptions, for example, i) a specific interrupt exception, i.e., a new exception occurring during handling a previous exception, ii) an infinite loop exception, i.e., an infinite exception loop caused by interactions between two applications during handling a previous exception, or iii) an out of memory exception, i.e., an out of memory exception occurs during handling a previous exception, and etcetera. When such critical problem exceptions occurs, current exception handling mechanisms terminate the application in execution.

Embodiments of the present disclosure may provide a mechanism to allow an application to have an eventual opportunity to handle such critical problem exceptions before being terminated.

Figure 2:
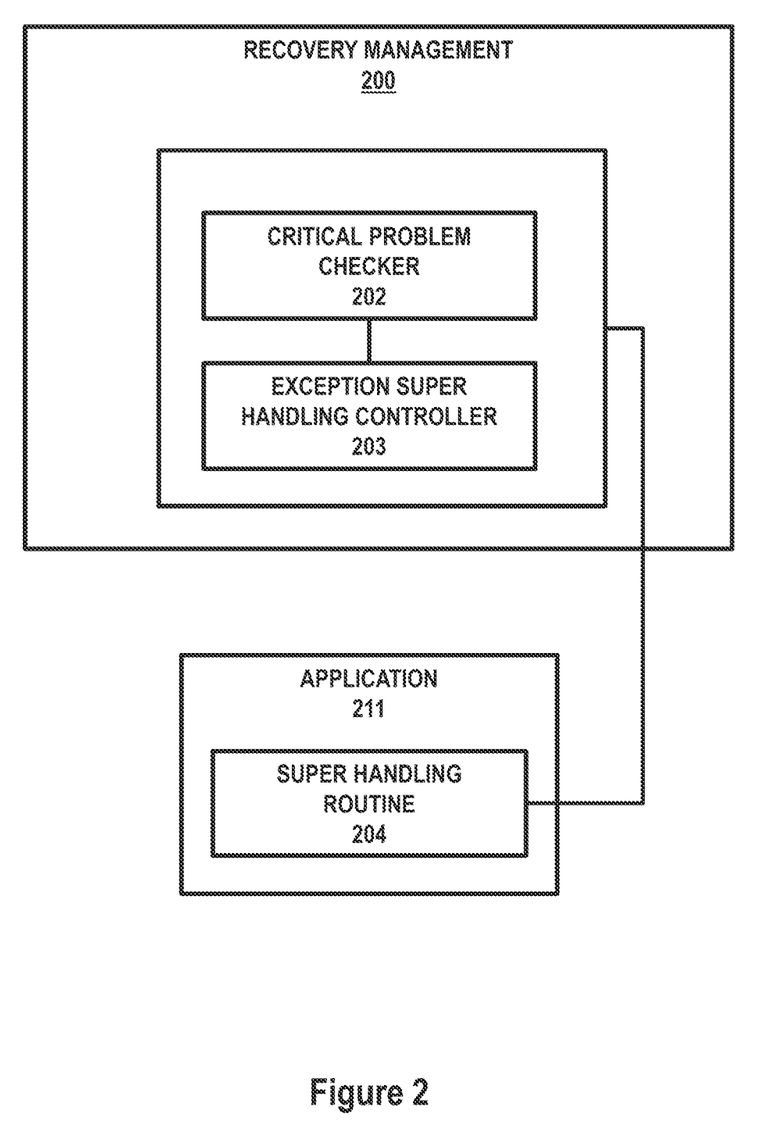
FIG. 2 depicts a block diagram of an exemplary recovery management 200 of the operating system 116, according to embodiments of the present disclosure.

FIG. 2 depicts a block diagram of an exemplary recovery management 200 component of the operating system 116, according to embodiments of the present disclosure. The recovery management 200 comprises a critical problem checker 202 and an exception super handling controller 203. The critical problem checker 202 comprises program instructions that when executed by the processor 102 checks the occurrence of critical problem exceptions during an execution of an application 211. The critical problem checker 202 may receive an indication of the critical problem exception from the operating system 116, or may receive the indication from the application 211. A critical problem exception is an exception that will result in a termination of the application 211. For example, a critical problem exception may be one of the following types: i) a specific interrupt exception, i.e., a new exception occurs during handling a previous exception, ii) an infinite loop exception, i.e., an infinite exception loop caused by inter-actions between two applications during handling a previous exception, or iii) an out of memory exception, i.e., an out of memory exception occurs during handling a previous exception. It should be pointed out that the three types of critical problem exceptions listed above are merely for the purpose of a simplified illustration, and other types of exceptions may also be considered as critical problem exceptions conforming the concepts and spirits of the disclosure, i.e., an exception that will result in a termination of the application 211.

Detection of a type of critical problem exception may be implemented in the recovery management 200 depending on the architecture of the computer system 100 and the operating system 116. For example, the occurrence of a certain type of critical problem exception may be determined responsive to receiving a specific status code (e.g., an error code) returned by the operating system. As an example, in the event of a specific interrupt exception (i.e., a new exception occurs during handling a previous exception) occurs, a corresponding status code indicating the occurrence of the specific exception is received from the operating system. Such occasion may occur, for example, in the event that an application 211 in execution invokes another application, and an exception occurs during the execution of the invoked application 211. The exception of the invoked application 211 causes the exception of the application 211 in execution. Then an exception handler of the application 211 is invoked. During exception handling, the exception handler of the application 211 finds out that the exception is caused by the invoked application 211 and waits for the termination of the invoked application 211, which is already in an exception status. A real life example is that the application 211 is a middleware application (e.g., IBM® Customer Information Control System (CICS)) and invokes a Java application during its execution. During the execution of the invoked Java program, an exception occurs (e.g., an ABEND) which leads to an exception of the middleware application. Then the exception handler of the middleware application may be invoked. The exception handler of the middleware application handles the exception and finds out that it should wait for the termination of the Java application which is already abended. Such situation will lead to a critical problem exception and a corresponding status code indicating such situation may be issued and received from the operating system 116.

Similarly, if an infinite loop exception (i.e., an infinite exception loop caused by interactions between two applications during handling a previous exception), or an out of memory exception (i.e., an out of memory exception occurs during handling a previous exception) occurs, respective corresponding status codes indicating the respective situation may be received from the operating system, the corresponding critical problem exceptions may then be determined. Also, according to another embodiment of the present disclosure, the detection of the occurrence of a certain type of critical problem exception may adopt a deep learning approach with a trained neural network. Such neural network may be trained with datasets representing the features of such critical problem exceptions. The detections of the occurrence of a critical problem exception are not limited to the approaches mentioned above.

The application 211 registers itself with the recovery management 200 exception super handling controller 203 by providing identifying information, such as its name and an address where the application 211 is loaded for execution. The registration further includes providing an identification (i.e., name and/or load address) of the super handling routine (SHR) 204 that will be invoked in response to the occurrence of the type of critical problem exception, along with the context (e.g., parameters, addresses). The exception super handling controller 203 invokes the SHR 204 with an indicator that corresponds to the detected type of the critical problem exception. The indicator may be, for example, an entry point address in the SHR 204 that corresponds to a pre-determined context included during the registration of the application 211. The pre-configured entry point address is an entry address of the SHR 204 instructions which may be retrieved by the operating system 116. The pre-determined context is an expected context corresponding to the type of critical problem exception to call the SHR 204. In this way a SHR 204 may handle more than one critical problem exceptions, based on an entry point address. Alternatively, the application 211 may register more than one SHR 204, one per critical problem exception.

The SHR 204 is called based on the instruction received from the exception super handling controller 203 is configured to handle such critical problem exceptions discussed above, which will be discussed in the following with reference to FIG. 3 and FIG. 4.

Figure 3:
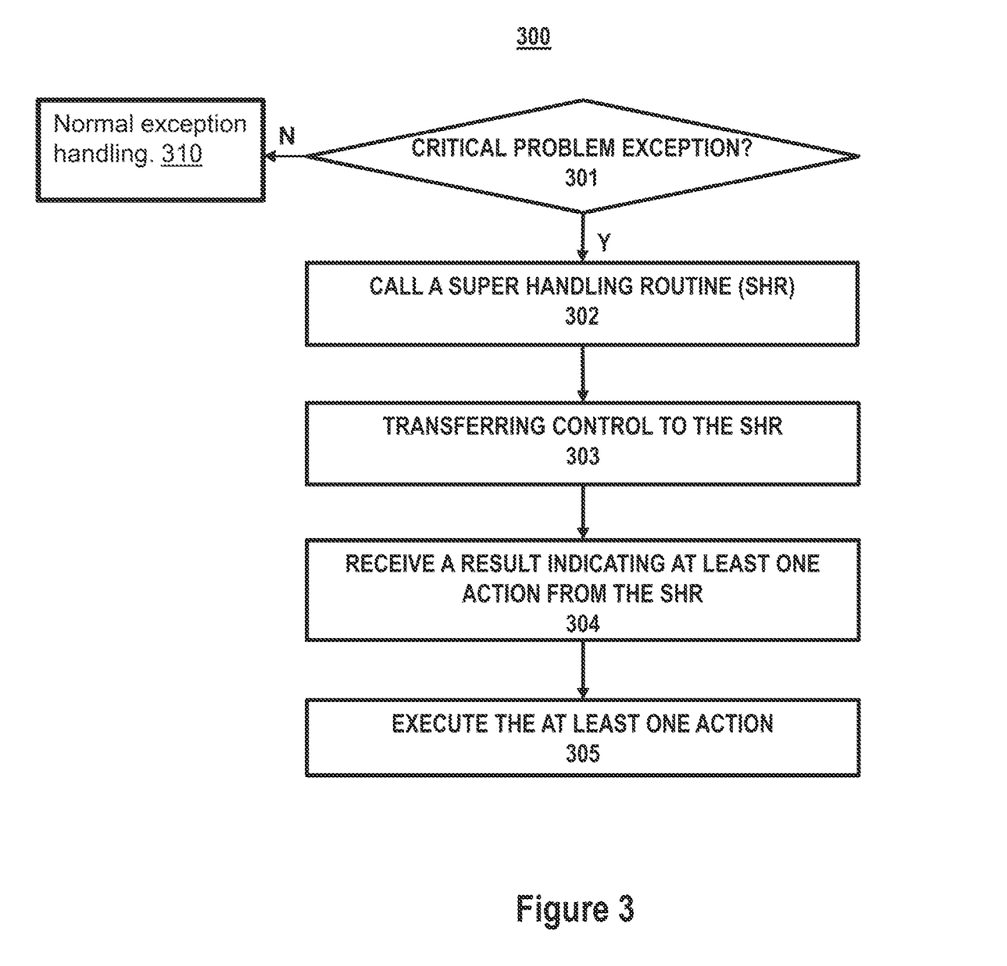
FIG. 3 depicts a flowchart of an exemplary method 300 according to an embodiment of the present disclosure.

FIG. 3 depicts a flowchart of an exemplary method 300 according to an embodiment of the present disclosure. The exemplary method 300 may, for example, be executed by the recovery management 200 shown in FIG. 2.

At step 301, it is determined whether an occurrence of a certain type of critical problem exception is detected during an execution of an application. The determination is made by the critical problem checker 202 receiving an indication of the critical problem exception, either from the operating system 116 or from the application 112. Detection of a type of critical problem exception may be implemented in the recovery management 200 depending on the architecture of the computer system 100 and the operating system 116. If the determination indicates no such critical problem exception occurs, at 310 the method 300 will flow to normal exception handling processing (not shown). If, however, it is determined that a certain type of critical problem exception occurs, the method 300 flows to step 302.

At step 302, the SHR 204 in FIG. 2, is called responsive to detecting the occurrence of the type of critical problem exception. The SHR 204 may be called by the exception super handling controller 203 in FIG. 2. The entry point that is called in the SHR 204 corresponds to the detected type of the critical problem exception. The entry point is the pre-configured address that is based on a pre-determined context that was registered by the application 211 in FIG. 2. The pre-configured address is an entry address of the SHR 204 and the pre-determined context is an expected context corresponding to the type of critical problem exception to call the SHR 204. For example, if it is detected that the critical problem exception is an infinite loop exception (i.e., an infinite exception loop caused by interactions between two applications during handling a previous exception), for example, by the critical problem checker 202 in FIG. 2, an infinite loop exception is marked and notified, for example, to the exception super handling controller 203 in FIG. 2. The exception super handling controller 203 then issues instructions to call the SHR 204 at the pre-configured address based on the pre-configured context of an infinite loop exception registered by the application 211. Similarly, if it is detected that the critical problem exception is an out of memory exception (i.e., an out of memory exception occurs during handling a previous exception) or a specific interrupt exception (i.e., a new exception occurs during handling a previous exception), for example, by the critical problem checker 202 in FIG. 2, an out of memory exception or a special interrupt exception is marked and notified, for example, to the exception super handling controller 203 in FIG. 2. The exception super handling controller 203 then issues instructions to call the SHR 204 at the pre-configured address based on the pre-configured context of an out of memory exception or a specific interrupt exception registered by the application 211.

The registration process of the pre-configured address and per-determined context of the SHR 204 may be implemented depending on the architecture of the computer system 100 and the operating system 116. After the SHR 204 has been called, the method 300 flows to step 303.

At step 303, the control is transferred to the SHR 204 from the exception super handling controller 203 in FIG. 2 for the handling of the type of critical problem exception. A context of the critical problem exception is also transferred to the SHR 204. Here, the context of the critical problem exception refers to the context when the critical problem exception occurs, that is to say, the context (or corresponding information) that causes the execution of the application to fail. The SHR 204 then handles the type of critical problem exception based on the received context of the critical problem exception. The SHR 204 returns to the exception super handling controller 203 the result of handling the critical problem exception. The result indicates at least one action, depending on different types of critical problem exceptions. For example, if the type of critical problem exception is a specific interrupt exception (i.e., a new exception occurs during handling a previous exception), the at least one action indicates a termination in the application 211. If the type of critical problem exception is an infinite loop exception (i.e., an infinite exception loop caused by interactions between two applications during handling a previous exception), the at least one action indicates a return to a specific caller (wherein the specific caller is at a specific address in the application 211 in execution and will not flow the application 211 into the loop again), i.e., first break the infinite loop by issuing a special interruption, then return the application 211 to the specific caller at the specific address in the application 211. If the type of critical problem exception is an out of memory exception (i.e., an out of memory exception occurs during handling a previous exception), the at least one action indicates a request for additional memory, i.e., additional memory from available memory should be allocated to the application 211. Different actions may be pre-configured in the SHR 204 depending on different types of the critical problem exceptions. The three types of critical problem exceptions discussed above are merely for the purpose of illustration and, again, embodiments of the present disclosure are not limited to the types of critical problem exception discussed above. Therefore, corresponding actions are not limited to the actions discussed above either.

At step 304, the at least one action discussed above is received, for example, by the exception super handling controller 203 in FIG. 2. Then the method 300 flows to step 305.

At step 305, the at least one action is executed, for example, instructed by the exception super handling controller 203 in FIG. 2. The execution of the at least action will be discussed later in the disclosure with reference to FIG. 4.

The embodiments of the present disclosure give an eventual opportunity to the application 211 to handle such critical problem exceptions before it is terminated. The eventual opportunity returns the application 211 to a point before the critical problem exceptions occur and gives the application 211 a potential opportunity to recover before being required to fail. If, however, the critical problem exception handling of the SHR 204 fails, the application 211 may be then terminated.

Figure 4:
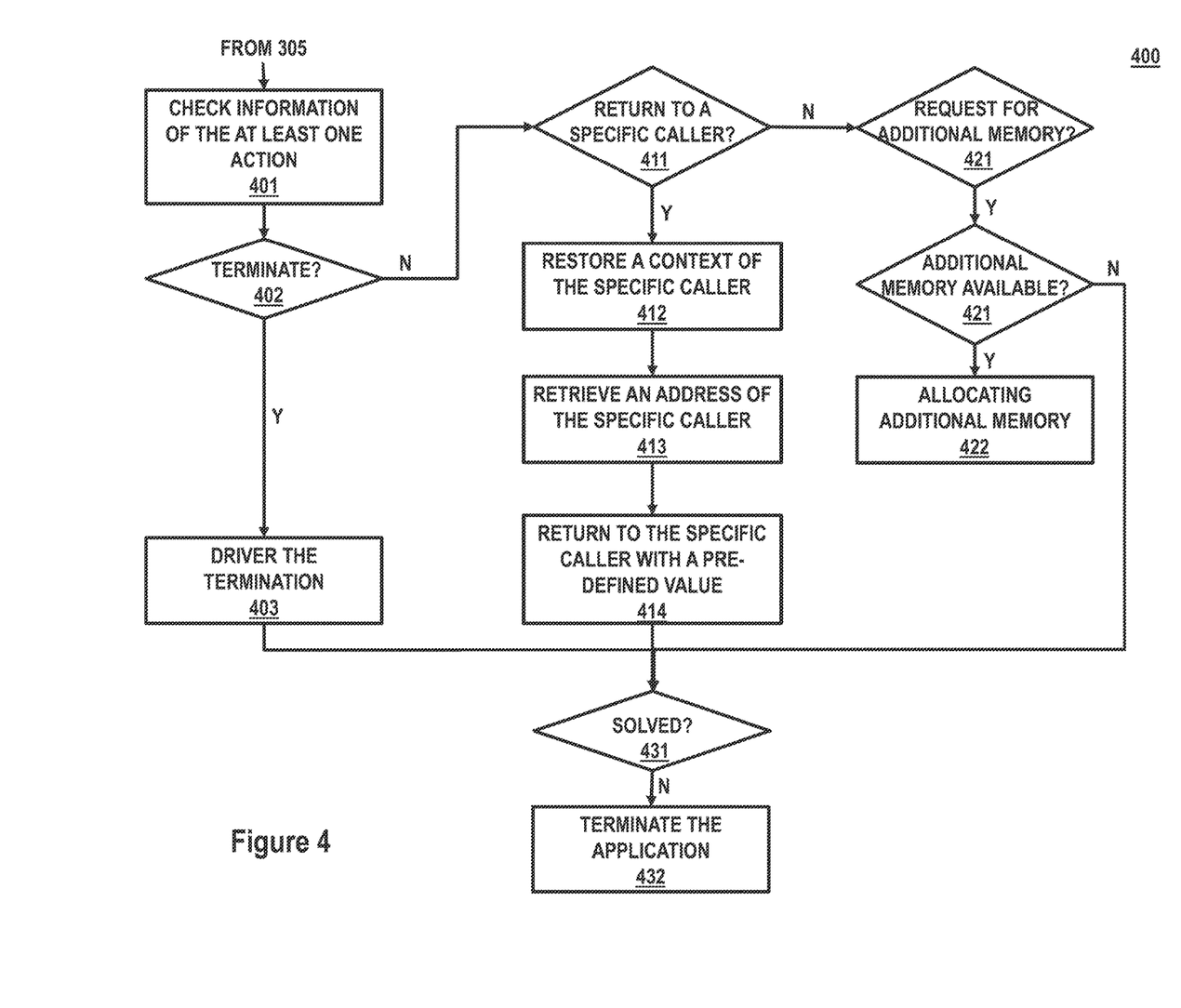
FIG. 4 depicts a flowchart of an exemplary method 400 according to an embodiment of the present disclosure.

FIG. 4 depicts a flowchart of an exemplary method 400 according to an embodiment of the present disclosure. The exemplary method 400 illustrates the process of executing the at least one action returned by the SHR 204, as discussed in the above with reference to FIG. 3.

According to embodiments of the present disclosure, the at least one action indicates the exception handling results of the SHR 204, and may comprise different actions depending on different types of critical problem exceptions. For example, if the type of critical problem exception is a specific interrupt exception (i.e., a new exception occurs during handling a previous exception), the at least one action indicates a termination in an invoked application 211, i.e., the termination of the invoked application 211. If the type of critical problem exception is an infinite loop exception (i.e., an infinite exception loop caused by interactions between two applications during handling a previous exception), the at least one action indicates a return to a specific caller (wherein the specific caller is at a specific address in the application 211 in execution and will not flow the application into the loop again), i.e., first break the infinite loop by issuing a special interruption, then return the application to the specific caller at the specific address in the application. If the type of critical problem exception is an out of memory exception (i.e., an out of memory exception occurs during handling a previous exception), the at least one action indicates a request for additional memory, i.e., additional memory from available memories should be allocated to the application 211. The three types of critical problem exceptions discussed above are merely for the purpose of illustration, embodiments of the present disclosure are not limited to the types of critical problem exception discussed above. The exemplary method 400 is discussed with the three types of critical problem exceptions discussed above as example, similarly, they are also merely for the purpose of illustration, corresponding actions are not limited to the actions discussed above, either.

The exemplary method 400 continues from step 305 in FIG. 3. At step 401, the information of the at least one action is checked. The information of the at least one action may comprise information of a target of the at least one action, a target address of the at least one action, and/or a parameter of the at least one action. The information of the at least one action may comprise more or less information, depending on the different actions. Also, the information of the at least one action may be pre-configured and pre-registered by the application.

Then at step 402, it is determined whether the at least one action indicates a termination in the application, for example, a termination of an invoked application. A termination in the application indicates that a certain part inside the application, for example, an invoked application by the application in execution, should be terminated, as discussed in the above as a specific interrupt exception scenario in which the exception handling of the application needs to wait the termination of the invoked application. If it is determined that the at least one action indicates a termination in the application, for example, a termination of an invoked application, drive the termination of the part in the application at step 403. After the part of the application has been terminated, the application may return to a point in the application before the invocation of the invoked application and continue to execute from the point.

If it is determined at step 402 that the at least one action does not indicate a termination in the application, for example, a termination of an invoked application, then at step 411, it is determined whether the at least one action indicates a return to a specific caller, wherein the specific caller is at a specific address in the application in execution and will not flow the application into the loop again. A return to a specific caller indicates that an infinite loop should be broken and the application should be returned to a specific caller that will not flow the application into the loop again, as discussed in the above as an infinite loop exception scenario in which an infinite exception loop caused by interactions between two applications during handling a previous exception. The specific caller may be a certain level of upper-level caller before entering the infinite loop, or pre-configured by the application, and upon receiving the at least one action indicating a return to the specific caller, a context of the specific caller may be first restored at step 412, and then an address of the specific caller may be retrieved at step 413. Then the application may be returned to the address of the specific caller with a predefined value at step 414. The predefined value may be pre-configured by the application such that by returning the application to the specific caller with the value, the application will not flow to the loop again.

If it is determined at step 411 that the at least one action does not indicate a return to a specific caller, whether the at least one action indicates a request for additional memory is determined at step 421. A request for additional memory indicates that additional memory from available memories should be allocated to the application, as discussed in the above as an out of memory scenario in which an out of memory exception occurs during handling a previous exception. Then at step 422, additional memory is allocated from available memory.

If, however, at step 431 after the execution of at least one action at step 403, step 414, step 422 fails to handle the critical problem exception, for example, the termination in the application fails, or the application fails to return to the specific caller, or additional memory fails to be allocated (e.g., there is no sufficient additional memory available), the application is terminated at step 432. According to embodiments of the present disclosure, an alert may also be issued by the operating system notifying the failure of the SHR critical problem handling.

Although the execution of the at least one action is discussed with reference to FIG. 4 in the order of a termination at step 402, a return to a specific caller at step 411, a request for additional memory at step 421, the order may be totally different. The order discussed with reference to FIG. 4 is merely an example and should not limit the scope of the present disclosure. Also, there might be more or less types of critical problem exception depending on the actual configuration of the registered SHR, therefore the corresponding of the execution of the at least one action may comprise more or less branches corresponding to the types of critical problem exceptions.

It should be pointed out that embodiments discussed with references to the figures are merely for the purpose of simplified illustration, therefore they should not adversely limit the scope of the disclosure.

It should be noted that the critical problem handling according to embodiments of this disclosure could be implemented by computer system 100 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a programmable data processing computer to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting, by one or more processing units, an occurrence of a certain type of critical problem exception during an execution of an application, the critical problem exception resulting in a termination of the application;
   instructing, by one or more processing units, to call a Super Handling Routine (SHR) corresponding to the type of the critical problem exception at a pre-configured address based on a pre-determined context registered by the application, the SHR being configured to handle critical problem exceptions;
   handling, by one or more processing units, control to the SHR to handle the type of the critical problem exception;
   receiving, by one or more processing units, a result of handling the critical problem exception from the SHR, wherein the result indicates at least one action;
   executing, by one or more processing units, the at least one action,
      wherein the at least one action indicates a request for additional memory, and the execution of the at least one action comprising:
      allocating, by one or more processing units, additional memory to the application from available memory; and
   notifying, by one or more processing units, a failure of the SHR critical problem exception handling by issuing an alert.

2. The computer-implemented method of claim 1, further comprising:
   transferring, by one or more processing units, a context of the critical problem exception to the SHR.

3. The computer-implemented method of claim 1, wherein the at least one action indicates a termination of an invoked application, and the execution of the at least one action comprising:
   issuing, by one or more processing units, an instruction to drive the termination of the invoked application.

4. The computer-implemented method of claim 1, wherein the at least one action indicates a return to a specific caller, and the execution of the at least one action comprising:
   restoring, by one or more processing units, a context of the specific caller;
   retrieving, by one or more processing units, an address of the specific caller; and
   returning, by one or more processing units, the application to the address of the specific caller with a predefined value.

5. The computer-implemented method of claim 1, wherein the critical problem exception being one of the following:
   a new exception occurs during handling a previous exception;
   an infinite exception loop caused by interactions between two applications during handling a previous exception; or
   an out of memory exception occurs during handling a previous exception.

6. A computer-implemented apparatus, comprising:
   a critical problem checker, configured to detect an occurrence of a certain type of critical problem exception during an execution of an application, the critical problem exception resulting in a termination of the application;
   an exception super handling controller, responsive to the occurrence of the critical problem exception, configured to instruct to call a Super Handling Routine (SHR) corresponding to the type of the critical problem exception at a pre-configured address based on a pre-determined context registered by the application;
   handling control to the SHR to handle the type of the critical problem exception, wherein the SHR is configured to handle critical problem exceptions;
   receiving a result of handling the critical problem exception from the SHR, wherein the result indicates at least one action;
   executing, by one or more processing units, the at least one action,
      wherein the at least one action indicates a request for additional memory, and the execution of the at least one action comprising:
      allocating, by one or more processing units, additional memory to the application from available memory; and
   notifying, by one or more processing units, a failure of the SHR critical problem exception handling by issuing an alert.

7. The computer-implemented apparatus of claim 6, wherein the exception super handling controller is further configured to:
   transfer a context of the critical problem exception to the SHR.

8. The computer-implemented apparatus of claim 6, wherein the at least one action indicates a termination of an invoked application, and the exception super handling controller is further configured to:
   issue an instruction to drive the termination of the invoked application.

9. The computer-implemented apparatus of claim 6, wherein the at least one action indicates a return to a specific caller, and the exception super handling controller is further configured to:
   restore a context of the specific caller;
   retrieve an address of the specific caller; and
   return the application to the address of the specific caller with a predefined value.

10. The computer-implemented apparatus of claim 6, wherein the critical problem exception being one of the following:
    a new exception occurs during handling a previous exception;
    an infinite exception loop caused by interactions between two applications during handling a previous exception; or
    an out of memory exception occurs during handling a previous exception.

11. A computer program product, comprising a non-transitory computer readable storage having program codes embodied therewith, the program codes comprising:
    program codes to detect an occurrence of a certain type of critical problem exception during an execution of an application, the critical problem exception resulting in a termination of the application;
    program codes to responsive to the occurrence of the critical problem exception, instruct to call a Super Handling Routine (SHR) corresponding to the type of the critical problem exception at a pre-configured address based on a pre-determined context registered by the application, the SHR being configured to handle critical problem exceptions;

program codes to handling control to the SHR to handle the type of the critical problem exception;

program codes to receiving a result of handling the critical problem exception from the SHR, wherein the result indicates at least one action;

program codes to executing the at least one action, wherein the at least one action indicates a request for additional memory, and the execution of the at least one action comprising:

program codes to allocating additional memory to the application from available memory; and program codes to notifying a failure of the SHR critical problem exception handling by issuing an alert.

12. The computer program product of claim 11, wherein the program codes further comprising:

program codes to transfer a context of the critical problem exception to the SHR.

13. The computer program product of claim 11, wherein the at least one action indicates a termination of an invoked application, and the program codes further comprising:

program codes to issue an instruction to drive the termination of the invoked application.

14. The computer program product of claim 11, wherein the at least one action indicates a return to a specific caller, and the program codes further comprising:

program codes to restore a context of the specific caller;

program codes to retrieve an address of the specific caller; and program codes to return the application to the address of the specific caller with a predefined value.

* * * * *